May 1, 1962     F. SNEEN     3,032,020
HYDRAULIC SERVOMOTOR

Filed March 31, 1961

3,032,020
HYDRAULIC SERVOMOTOR
Franz Sneen, Skanninge, Sweden, assignor to Konstruktioner & Experiment A.B., Skanninge, Sweden
Filed Mar. 31, 1961, Ser. No. 99,852
Claims priority, application Sweden Apr. 4, 1960
2 Claims. (Cl. 121—99)

It is known to produce a rotating movement by placing a shaft to be rotated, in an annular housing surrounding the shaft, which housing is provided with two diametrically opposite abutments bearing glidably against the shaft and providing the shaft with two diametrically opposite pistons bearing glidably against the housing and on the sides of the two abutments and to provide the housing with openings through which fluid under pressure can be introduced and leave the housing.

However great difficulties have been met in order to keep such a rotating element in a certain angular position while the shaft is exposed to an opposite torque, which is due to leakage of fluid under pressure past the pistons, mainly at parts bearing against end plates of the housing, and also at parts bearing against the jacket surface of the housing and at those parts of the abutments bearing against the shaft.

The present invention provides an arrangement in servomotors, by which these difficulties are overcome.

The arrangement according to the invention consists of a cylindrical housing with mainly flat end plates, in which a shaft is mounted rotatably and concentrically, and a cylindrical jacket of the housing is provided with at least one abutment bearing glidably against the said shaft and which shaft is provided with at least one piston bearing glidably against the housing, the housing and the pressure fluid loaded sides of the said abutments and pistons being provided with seals of flexible material, whose edges thereof are bent up on all sides whilst the ends of the abutments and the pistons turned towards the end plates of the housing are rounded in radial longitudinal section.

This arrangement according to the invention is characterised by the feature that the end plates are provided on their inside with packings of flexible, elastic material, for example nylon, which packings are provided on their inside with annular tapering parts, intended to be pressed against the shaft and the jacket surface and tightened by the liquid pressure.

The invention is shown on the attached drawing in which.

Figure 1:
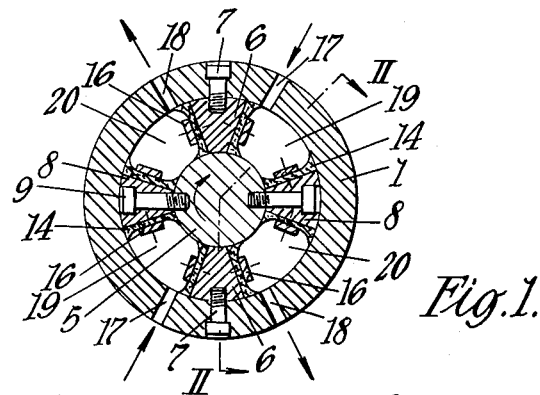
FIGURE 1 shows a form of embodiment of a servomotor according to the invention seen in cross-section.
Figure 2:
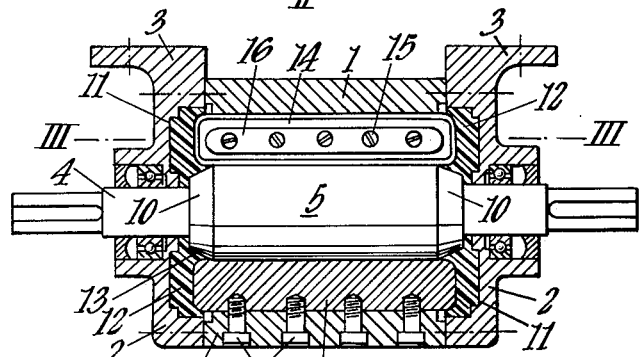
FIGURE 2 shows the same seen in section along the line II—II on FIGURE 1.
Figure 3:
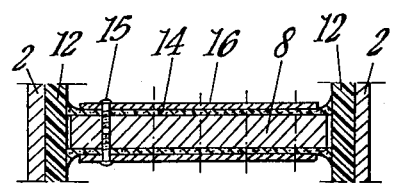
FIGURE 3 shows the same seen in section along the line III—III on FIGURE 2.

A housing 2 with cylindrical jacket 1 and in mainly flat end base plates 2 is suitably provided with end plates 3 for its fixing with a support. A shaft 4 is mounted rotatably and concentrically in the housing 2. The part 5 of the shaft situated between the base plates 2 has greater diameter than its other parts.

The jacket 1 of the housing is provided with two diametrically opposite abutments 6, which are suitably fixed on the jacket 1 by means of screws 7. The sides of the abutments 6 are suitably flat and directed radially. The abutments 6 are so high that they extend forwards to the shaft part 5 and bear glidably against it. Their ends turned towards the plates 2 are rounded in radial direction.

The shaft 4 is provided with two diametrically opposite pistons 8, which are made in the same way as the abutments 6 and bear against the inside of the jacket 1. The pistons 8 are, for example fixed to the shaft part 5 by means of radial screws 9.

The part 5 of the shaft 4 at its ends is bevelled at 10, starting at that point where the ends of the pistons 8 begin to be rounded.

The end plates 2, 3 are provided with concentric recesses 11, opening towards the interior of the housing, into which packings 12 of any elastic, flexible material, for example nylon are placed. These packings 12 face the working chamber of the housing and are so formed that they bear glidably against the rounded end of the pistons 8 and against the bevelled parts 10 of the shaft 5, in which case they bear with a pointed, annular tapering part 13 between the bevelled part 10 and the rounded ends of the piston 8.

The abutments 6 and the pistons 8 are provided on their sides with seals 14 of any flexible material, for example leather, rubber or the like, which seals 14 bear with their turned up edges against the shaft part 5, the jacket 1 of the housing and the packings 12. The seals are held by plates 16 fixed by means of screws 15.

The jacket 1 of the housing is provided on both sides of the abutments 6 with openings 17, 18 for the inlet and outlet of fluid under pressure.

The arrangement works in the following manner:

When the fluid under pressure is introduced through the openings 17 into the housing it acts on the pistons 8 and rotates the shaft 1 in the direction of the arrow until the pistons 8 strike against the abutments 6, whereupon the fluid under pressure presses the bent up edges of the seals 14 against the shaft part 5, the jacket 1 and the packings 12, so that they effectively tighten against same. At the same time the annular tapering part 13 is pressed against the bevelled parts 10 of the shaft part 5, so that they tighten effectively against same. By this means the spaces 19 within the housing filled with fluid under pressure become effectively tight against the spaces 20 in the housing without pressure, so that the shaft 4 and the pistons 8 can be brought to a stand still for practically as long as desired as in the case of a shaft such as 4 loaded with a torque.

Although only one form of embodiment is shown and described above other embodiments may be proposed without departing from the scope of the invention as will be apparent to those skilled in the art.

I claim:

1. In a fluid servomotor, consisting of a cylindrical housing with mainly flat end plates in which a shaft is mounted rotatably and concentrically, and a cylindrical jacket of the housing which is provided with at least one abutment bearing glidably against the said shaft and which shaft is provided with at least one piston bearing glidably against the housing, the said housing being provided on both sides of the abutments with openings through which fluid under pressure can be introduced into and leave the housing, and the pressure fluid loaded sides of the abutments and the pistons are provided with seals, of flexible material, with edges thereof bent upwards on all sides whilst the ends of each abutment and of each piston turned towards the end plates of the housing are rounded in radial longitudinal section, the improvement wherein the end plates are provided with packings of elastic flexible material, which packings face the working chamber of the housing and are provided with annular parts disposed to be pressed against the shaft and the jacket surface of the housing and tightened by the fluid pressure.

2. A fluid servomotor according to claim 1, wherein that part of the shaft situated between the end plates is of greater diameter than the ends of the shaft, said part of the shaft being bevelled in such manner that spaces are formed between rounded ends of the abutments and the pistons into which fit annular tapering parts of the packings for bearing against the said shaft part.

References Cited in the file of this patent

UNITED STATES PATENTS

| | | |
|---|---|---|
| 2,633,105 | Lasater | Mar. 31, 1953 |
| 2,870,748 | Hemphill | Jan. 27, 1959 |